(12) United States Patent
Schwarz

(10) Patent No.: US 6,918,718 B2
(45) Date of Patent: Jul. 19, 2005

(54) THREAD CUTTING TOOL HAVING CUTTING TEETH WITH STEPPED UNDERCUT FLANKS

(75) Inventor: Friedrich Schwarz, Schwanau (DE)

(73) Assignee: Sandvik AB, Sandviken (SE)

( * ) Notice: Subject to any disclaimer, the term of this patent is extended or adjusted under 35 U.S.C. 154(b) by 225 days.

(21) Appl. No.: 10/291,665

(22) Filed: Nov. 12, 2002

(65) Prior Publication Data

US 2003/0108396 A1 Jun. 12, 2003

(30) Foreign Application Priority Data

Nov. 14, 2001 (DE) .......................................... 101 55 979

(51) Int. Cl.[7] .................................................. B23G 5/06
(52) U.S. Cl. ........................ 408/222; 470/198; 408/220
(58) Field of Search ................................ 408/219, 220, 408/222; 470/198

(56) References Cited

U.S. PATENT DOCUMENTS

| | | | |
|---|---|---|---|
| 150,346 A | * 4/1874 | Morgan | 408/222 |
| 700,892 A | * 5/1902 | Blackburn | 408/222 |
| 2,024,169 A | * 12/1935 | Koonz | 408/220 |
| 5,127,776 A | 7/1992 | Glimpel | |
| 5,993,120 A | * 11/1999 | Giessler | 408/59 |

FOREIGN PATENT DOCUMENTS

| | | | |
|---|---|---|---|
| FR | 2610555 | * | 4/1988 |
| FR | 2 623 114 | | 5/1989 |
| JP | 6-179121 | * | 6/1994 |
| JP | 6-344225 | * | 12/1994 |

OTHER PUBLICATIONS

Automatic Machining, author unknown, pp. 46–48, Jul. 1957.*

* cited by examiner

*Primary Examiner*—Daniel W. Howell
(74) *Attorney, Agent, or Firm*—Burns, Doane, Swecker & Mathis, LLP

(57) ABSTRACT

A thread cutting tool for cutting female threads includes a shaft and a cutting section composed of several groups of cutting teeth alternating with chip grooves. At least some of the teeth, preferably teeth disposed in a front region of the tool, have undercuts in their flanks which define radial steps, each step spaced circumferentially from a cutting edge of the respective tooth in order to form a space which facilitates the escape of cuttings.

16 Claims, 2 Drawing Sheets

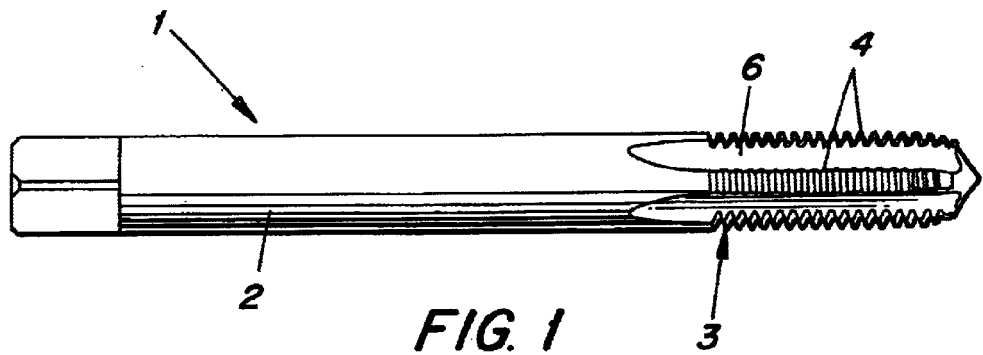
FIG. 1
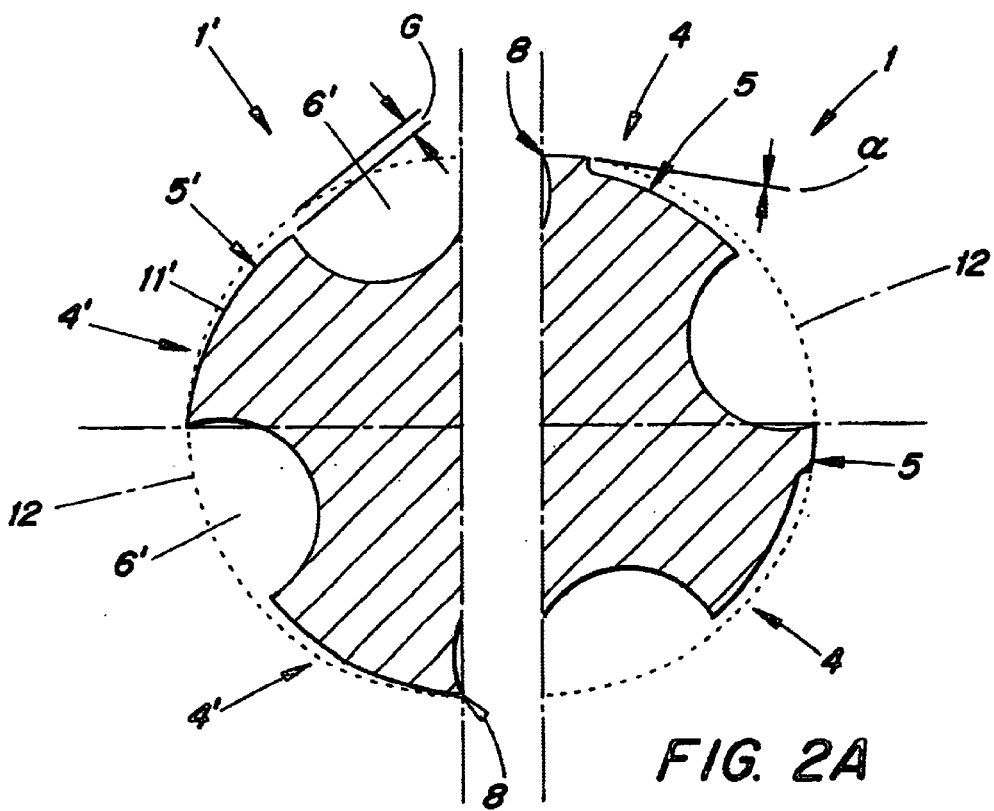
FIG. 2
(PRIOR ART)
FIG. 2A

THREAD CUTTING TOOL HAVING CUTTING TEETH WITH STEPPED UNDERCUT FLANKS

This application claims priority under 35 U.S.C. § 119 to Patent Application Serial No. 101 55 979.8 filed in Germany on Nov. 14, 2001, the entire content of which is hereby incorporated by reference.

BACKGROUND

The present invention relates to a thread cutting tool for cutting female threads, with a shaft and a cutting section that is composed of several axially parallel or spirally arranged cutter rows each provided with a group of cutting teeth and chip grooves arranged in between them.

The term "thread cutting tool" generally includes so-called screw taps, and also certain types of thread milling cutters to the extent that they are for manufacturing female threads. Such a thread cutting tool either itself produces the thread bore, i.e., the core boring for a thread, or it is screwed into a previously prepared bore, the diameter of which is usually in proportion to the final thread diameter, depending on the material of the workpiece. The thread cutting tool is screwed into the bore with a forward movement matched accurately to its speed of rotation, wherein the cutting teeth, which are arranged in several substantially parallel groups (known as cutter rows), cut the threads. In the case of a single-flight thread, the distance apart of the cutting teeth, respectively arranged in the axial direction behind one another, of a group, exactly corresponds to the thread pitch.

Generally, in the forward area of such a tool, i.e., the so-called initial cut portion, the external diameter of the cutting tool increases in the axial direction rearwards from the tip, whereby the axially forward teeth are of smaller radii. Such axially forward cutting teeth are configured wider, and cut the thread grooves, while the following cutting teeth are arranged on an increasingly larger radius, and in this way cut out the thread grooves lying between the thread flanks to the desired depth. With increasing tooth diameter, that is to say the distance from the base of the groove, the thread grooves become increasingly narrow, and the cutting teeth are also correspondingly configured with a narrower land. The cross-section of the cutting teeth corresponds to the cross-section of the thread grooves to be produced, so the auxiliary cutting edges of the cutting teeth come together at the flank angle of the thread, while the main cutting edge cuts the base of the thread groove. Behind the initial cut portion there is located the guiding area where although the cutter rows still have teeth, these do not cut or hardly cut, and instead simply provide continuous precise guidance of the thread cutting tool.

The forward cutting teeth in particular, that is to say the cutting teeth in the initial cut portion area, which do not cut the thread groove to full depth, are configured correspondingly wide, as they create the further portion of the thread profile. The flank adjoining the main cutting edge of a cutter row generally has a clearance angle in the order of 0.5° to 10°, typically of 1° to 2° relative to the circumferential surface created by the respective main cutting edge.

Once an appropriate thread cutting tool has been screwed into an appropriate bore to the desired depth, and has thus cut the desired thread, the tool is axially withdrawn. During the axial withdrawing movement the tool must be rotated in the opposite direction, matching the thread pitch, and is thus effectively unscrewed from the thread that has been produced. In cutting the thread, however, chippings are also inevitably produced from the material of the workpiece, which, in particular in the case of blind bores, are only partially conveyed out of the thread bore during thread cutting. Thus, when the thread cutting tool is unscrewed from the thread bore, some chippings may stick between the cutting teeth and the thread that has been produced, and not only damage the thread that has been produced but also contribute to a larger degree of wear and tear on the thread rows. In particular, in the case of very hard materials such as, for example, highly alloyed steels, the chippings that become stuck to the flanks of the cutting teeth lead to portions of the cutting edges breaking off. In particular, in the case of thread cutting tools wherein at least the cutting teeth are composed of solid carbide (to be used for cutting in particularly hard substances), the danger of breakage of cutting edges because of adhering chippings is particularly great. In general, adhering chippings lead to faster wear and tear of thread cutting tools.

Given this background, the object of the present invention is to provide a thread cutting tool with the features described in the introduction, wherein wear and tear is considerably reduced and which has significantly greater durability than conventional thread cutting tools. These advantages will come to the fore particularly when cutting threads in relatively hard and/or ductile metallic substances such as, for example, fine steel. In particular, by means of the present invention the cutting edges of the cutting teeth will suffer less damage and in particular less breakages even after prolonged use of the thread cutting tool.

SUMMARY OF THE INVENTION

This object is solved in that at least a portion of the cutting teeth is provided with a radial undercut on the flank behind the respective cutting edges.

The prior art flanks are usually curved inwards at a very small and low angle relative to the circumferential surface created by the respective cutting edge as shown in FIG. 2, so that a very narrow wedge-shaped space G is formed between the flank and the circumferential surface 12. However, in accordance with the present invention, this flank is clearly offset rearwards in the radial direction at a distance from the cutting edge, that is to say seen from the cutting edge it forms a radial undercut, which in turn forms a radial step.

An initial section of the flank disposed immediately behind the cutting edge still has the usual prior art configuration in order not to weaken the cutting edge area of the cutting tooth, because with a smaller wedge angle it could possibly be less able to withstand the usual cutting forces. At a sufficient circumferential spacing away from the cutting edge, however, the radial distance between the flank and the cut circumferential surface is significantly enlarged by means of the undercut described, that is to say the long and very narrow wedge-shaped space between the flank and the circumferential surface is considerably increased, and this increased clearance only terminates a relatively short distance away from the cutting edge. Although any chippings can then collect in this clearance, they are carried along without any problems at least at the beginning of the reverse rotation, while the very narrow, wedge-shaped clearance between the flank and the circumferential surface remains confined to a very short section immediately behind the cutting edge so practically no chippings can become jammed there; in particular the gap between the flank and the circumferential surface is still so narrow there that practically no chippings can enter it.

The same problem also occurs in principle with thread milling cutters that produce a simple bore when advanced and only cut the thread when reversed in an eccentric path of motion. In this case a similar loading can occur on the cutting edges during production of the bore when advancing, even when because of a greater clearance of the cutting teeth in the bore produced with such a tool and because of the possible omission of a flank pointing radially inwards, the danger of damage to the cutting edges is somewhat less. The invention is equally applicable in a similar manner to such tools.

The undercut preferably begins at a distance circumferentially behind the cutting edge that is 5–50% preferably approximately 10 to 30%, of the length of the culling tooth, i.e., the distance is measured in the direction of the circumference. This distance is most preferably between 15 and 25% or even 18–20% of the length of the cutting tooth (measured in the direction of the circumference). In this way the effect described is obtained, in that the wedge-shaped space remaining between the flank and the circumferential surface of the thread bore is very narrow and remains confined to a short section of the cutter row.

It is also preferable when, proceeding from the flank, the undercut begins relatively abruptly by a portion that has a mainly radial component. In this way a relatively steep transitional surface or step, oriented substantially in the radial direction, is formed from the base of the undercut to the part of the flank not affected by the undercut, and on this steep flank any chippings possibly collected in the undercut are easily carried along backwards without any danger of these chippings entering into the remaining narrow gap between the remaining section of the flank and the circumferential surface.

Advantageously, proceeding from the section of the flank close to the cutting edges, the base of the undercut, seen in an axial section, is firstly substantially radial and then curved, or simply angled towards the direction of the circumference. In this way there is a relatively constantly wide space between the base of the undercut and the circumferential surface that provides enough space for receiving any chippings.

The base of the undercut goes as far as the rear end of the cutting tooth and at least over half the length of the cutting tooth approximately parallel to the circumferential direction. It is advantageous in particular when, proceeding from the point lying radially innermost, the base of the undercut is substantially parallel to the circumferential direction, that is to say the base of the undercut is at a largely constant distance from the wall of the thread cut by the cutting tooth. Clearly, it is also possible that, proceeding from the deepest point of the undercut, the base of the undercut again runs slightly radially outwards, so that towards the rear end of the cutting tooth, the distance between the wall of the thread and the base of the undercut decreases again somewhat. The "wall" of the thread is the groove base cut by the respective cutting tooth in question.

It has proved particularly advantageous when a value for the maximum depth of the undercut (measured in the radial direction) is maintained that is between 0.5 and 10% preferably between 2 and 10%, of the radius of the thread cutting tool. This percentage value nevertheless also depends on the absolute diameter of the respective thread and respectively the thread cutting tool, because with small thread diameters, the depth of the undercut has to be relatively larger than with large thread diameters. In absolute terms, undercut depths have proved advantageous that are in the range of 0.1 to 3.0 mm preferably 0.5 to 2.0 mm, wherein the depth of the undercut is also related in this case to the cutting edge of the respective cutting tooth, that is to say the depth results from the difference in the radii of the cutting edge and the base of the undercut.

In general it can be said that it has proved particularly advantageous when the depth of the undercut corresponds approximately to the radial tapering of a conventional flank on the rear end of a cutting tooth. Because of the generally relatively constant curvature of a conventional flank, that typically forms an angle of approximately 1–2° relative to the direction of the circumference, there is produced at the rear end of the conventional cutting tooth, a short radial taper that is also approximately in the range of 0.5 to 10% of the radius of the thread cutting tool. According to the invention, however, this radial taper is not limited to the end section of the cutting tooth, but instead extends for a relatively long distance to a location where a relatively abrupt transition into the conventional flank shape takes place.

For most applications it has proved sufficient for the undercut according to the invention to be limited to the cutting teeth lying axially furthest forward, that is to say in the so-called initial cut area. Specifically, it generally suffices for the first two to five cutting teeth of a cutter row to be provided with a corresponding undercut. The cutting teeth lying axially further back practically no longer cut rather but have substantially guiding tasks, so no chippings form there, or hardly any, and chippings also do not collect in this flank that is relatively narrow in this area. In particular in the case of the forward and relatively wide cutting teeth forming the initial cut portion, the effect of the flank is particularly clear, particularly as conventionally it is precisely the forward cutting teeth whose cutting edges wear particularly quickly.

It is particularly preferable for the present invention to be used in a thread cutting tool that is produced from solid carbide, as solid carbide tools in particular are used to cut in correspondingly difficult substances, where the danger of damage to or breakage of cutting edges is particularly great, i.e., solid carbide has a tendency to break more easily than conventional tool grade steel.

The present invention is furthermore particularly advantageously implemented in cutting tools where the groups of cutting teeth and the grooves for chippings are substantially axially parallel or have a very large helical pitch, because with these types of tool, the transport of the chippings by the grooves for chippings is often particularly quite poor, and the invention advantageously avoids the negative effects of the numerous chippings frequently present.

BRIEF DESCRIPTION OF THE DRAWINGS

Further advantages, features and possibilities for application of the present invention will be evident from the following description of a preferred embodiment and the attached drawings.

FIG. 1 is a side view of a screw tapping tool according to the invention.

FIG. 2 is a section through a prior art screw tapping tool approximately perpendicular to the axis in the area of one of the forward thread cutting teeth.

FIG. 2A is a section through a screw tapping tool according to the invention, approximately perpendicular to the axis in the area of the forward thread cutting teeth.

DESCRIPTION OF A PREFERRED EMBODIMENT OF THE INVENTION

Figure 3:
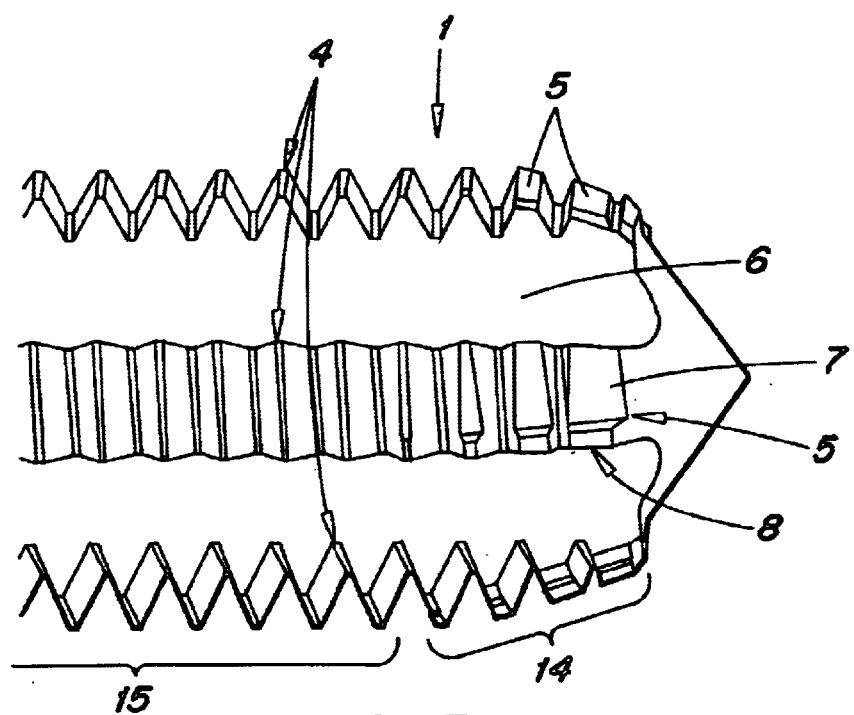
FIG. 3 is an enlarged section of FIG. 1.

FIG. 1 shows the thread cutting tool, generally designated 1, in the form of a screw tapping tool that is provided with a shaft 2 and a cutting portion 3. The shaft 2 in this case is shown as a simple cylindrical shaft, but can, however, be of any other shape according to how the corresponding chuck or clamping chuck of a machine tool is configured. The cutting portion 3 is provided with several cutter rows 4 that are each composed of a group of cutting teeth 5, and has grooves for chippings 6 in between. In the present case, the chipping grooves 6 and the cutter rows 4 or respectively groups of cutting teeth are on a relatively steep helical curve.

FIG. 2 is a cross-sectional view through the left half of a prior art thread cutting tool 1', whereas FIG. 2a is a cross section through the right half of a thread cutting tool 1 according to the present invention.

FIG. 3 shows an enlargement of the cutting portion 3 according to the invention. The cutting portion 3 is divided in the axial direction into a so-called initial cut portion 14 and a guide section 15. The main volume of the chippings produced by the cutting of threads is produced almost exclusively in the initial cut area 14, while the guide portion 15, as its name implies, mainly acts as a tool guide in the turns of the thread already cut by the teeth on the initial cut area. In the circumferential direction, the cutting portion is divided into cutter rows 4 and grooves 6 for chippings. The cutter rows 4, respectively composed in this case of a group of teeth 5, in this case running axially, the forward teeth of which, as already described, form the initial cut portion and the rear teeth of which do not cut, or only to a small extent. As already described, the rear teeth act substantially only for guidance in the threads, whereby the teeth of the initial cut area are forced exactly along the helical path in the imaginary prolongation of the length of the thread.

As is evident, the modification according to the invention in the embodiment shown has been substantially limited to the initial cut area 14, even though it would be possible to provide the flanks of all of the remaining teeth 5 of the cutter rows 4 with an undercut 7 in the manner shown.

In the middle group of cutting teeth in FIG. 3, on the cutting tooth 5 lying furthest forward, the cutting edge 8 and the undercut 7 are referenced with appropriate designations.

In the radial section according to FIG. 2 it is evident that the prior art thread cutting tool shown here has four groups 4' of thread cutting teeth and four grooves 6' for chippings arranged in between them (two groups 4' and two grooves 6' being depicted). The conventional form of the flanks of the thread cutting teeth 5' results in the formation of a very narrow wedge-shaped gap G between the outermost circumference 12 and the flank 11 of each tooth. When reversing the rotation to back-out the tool, chippings can jam in this gap which could lead to breakage of the cutting edge when the chippings remain attached to the wall of the thread, and when there is reverse rotation of the thread cutting bore the flank with the cutting edge is pressed over the chipping.

Figure 4:
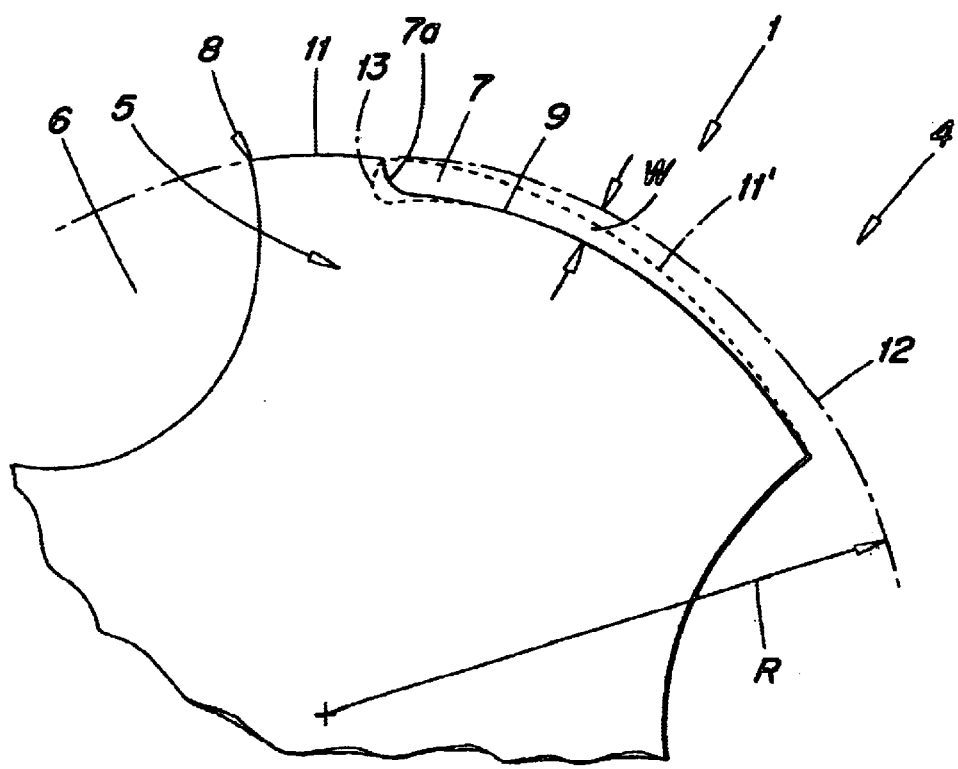
FIG. 4 is an enlarged section of FIG. 2.

FIGS. 2A and 4 depict an undercut 7 formed in each flank 11 according to the invention. In broken lines, FIG. 4 also shows for comparison purposes where the conventional blank 11' would have been located.

Adjoining the cutting edge 8 in FIGS. 2A and 4, a short section 11 of the flank is shaped like a conventional flank in that it forms a small angle α typically between 0.5 and 5° relative to the outer circumference 12 (shown in doffed lines). The circumference 12 also defines a wall of a female thread which was created by the cutting edge 8. At a distance from the cutting edge 8 that is 5–50% of the length of the cutting tooth 5 measured in the circumferential direction, or preferably 18–20% of that length for the embodiment according to FIGS. 2A and 4, the undercut 7 begins with a relatively abrupt return in the flank 11 in the radial direction, approximately along a circular curved arc. Thus, the base 9 of the undercut 7 firstly, beginning at the end of the flank section 11, extends in the radial direction to form a step 7a and then curves in the circumferential direction along an arc and over the majority of its length parallel to the circumference, that is to say parallel to the line of the circumference 12.

A conventional flank shape is shown in FIG. 2A by the dotted line 11', which forms the wedge-shaped gap G with respect to the circumferential surface 12. On the other hand, the undercut 7 forms an open space with respect to the circumferential surface 12 with a constant width W, which in the example shown is approximately 4% of the radius R defined by the cutting edge 8 of the cutting tool. Because of the relatively abrupt or stepped arc-shaped form of the base 9 of the undercut 7 at the transition to the flank section 11, any chippings possibly collecting in the undercut 7 are carried along without any problems when the thread cutting tool is rotated in reverse (during withdrawal of the tool) without entering into the remaining very narrow gap between the flank section 11 and the circumference or wall 12 of the cut thread.

If necessary, proceeding from the cutting edge section 11, this arc-shaped transition of the undercut 7 can be configured more markedly, that is to say undercut more exactly radially, and the base of the undercut 9 can also be still deeper at some points, as is indicated by a broken line 13.

The first section of the undercut 7 or respectively of the base 9, i.e., the section which forms the step 7a, does not have to be curved as shown, but instead can be straight and run somewhat radially inwards, wherein the correspondingly steep flank inflects very rapidly in the direction of the circumference.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A thread cutting tool for cutting a female thread, the tool comprising a shaft having front and rear end portions and defining a center axis, a cutting section disposed at the front end portion and formed by a plurality of groups of cutting teeth alternating circumferentially with chip-removal grooves, the teeth of each group arranged one behind the other in a generally front-to-rear direction along the shank, at least some teeth including a cutting edge and a flank extending generally circumferentially therefrom toward the next tooth in the same group, the flank being radially undercut to form a radial inward step at a circumferential distance from the cutting edge wherein the at least some teeth comprise less than all of the teeth and are disposed in an axial front portion of the tool.

2. The thread cutting tool according to claim 1 wherein the generally front-to-rear direction is parallel to a center axis of the shank.

3. The thread cutting tool according to claim 1 wherein the circumferential distance from the cutting edge to the step is in the range of 5–50% of a circumferential length of the tooth.

4. The thread cutting tool according to claim 3 wherein the range is 10–30%.

5. The thread cutting tool according to claim 2 wherein the step is substantially radially directed.

6. The thread cutting tool according to claim 1 wherein the step is substantially radially directed.

7. The thread cutting tool according to claim 6 wherein the step extends initially radially inwardly and then curves in a generally circumferential direction.

8. The thread cutting tool according to claim 1 wherein the undercut includes a base extending from the step in a direction substantially parallel to an outermost circumference defined by the tool.

9. The thread cutting tool according to claim 8 wherein a circumferential length of the base is at least one half of a total circumferential length of the respective tooth.

10. The thread cutting tool according to claim 1 wherein starting from a radially innermost end of the step, the undercut extends substantially parallel to an outermost circumference defined by the tool.

11. The thread cutting tool according to claim 1 wherein a radial depth of the step is in the range of 0.5–10% of a maximum radius of the tool.

12. The thread cutting tool according to claim 11 wherein the percentage is 2–4%.

13. The thread cutting tool according to claim 1 wherein the step has a radial depth from an outer circumference of the tool in the range of 0.1–2 mm.

14. A thread cutting tool for cutting a female thread, the tool comprising a shaft having front and rear end portions and defining a center axis, a cutting section disposed at the front end portion and formed by a plurality of groups of cutting teeth alternating circumferentially with chip-removal grooves, the teeth of each group arranged one behind the other in a generally front-to-rear direction along the shank, at least some teeth including a cutting edge and a flank extending generally circumferentially therefrom toward the next tooth in the same group, the flank being radially undercut to form a radial inward step at a circumferential distance from the cutting edge, wherein the circumferential distance from the cutting edge to the step is in the range of 5–50% of a total circumferential length of the respective tooth, and wherein a circumferential length of the base is at least one half of the total circumferential length, a radial depth of the step being in the range of 0.5–10% of a maximum radius of the tool.

15. The thread cutting tool according to claim 1 wherein the number of teeth of each group having the undercut is from 2 to 5.

16. The thread cutting tool according to claim 1 wherein the shank is solid and comprises carbide.

* * * * *